US011310269B2

United States Patent
Liu et al.

(10) Patent No.: US 11,310,269 B2
(45) Date of Patent: Apr. 19, 2022

(54) METHODS TO DETECT SPOOFING ATTACKS ON AUTOMATED DRIVING SYSTEMS

(71) Applicant: Baidu USA LLC, Sunnyvale, CA (US)

(72) Inventors: Xiaodong Liu, San Jose, CA (US); Ning Qu, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 189 days.

(21) Appl. No.: 16/653,711

(22) Filed: Oct. 15, 2019

(65) Prior Publication Data

US 2021/0112094 A1    Apr. 15, 2021

(51) Int. Cl.
*H04L 29/06*   (2006.01)
*B60W 50/02*   (2012.01)
*B60W 50/04*   (2006.01)
*G01C 21/34*   (2006.01)
*G06K 9/00*    (2022.01)

(52) U.S. Cl.
CPC ..... *H04L 63/1483* (2013.01); *B60W 50/0225* (2013.01); *B60W 50/045* (2013.01); *G01C 21/3415* (2013.01); *G06K 9/00805* (2013.01)

(58) Field of Classification Search
CPC .......... H04L 63/1483; B60W 50/0225; B60W 50/045; G01C 21/3415; G06K 9/00805
See application file for complete search history.

(56) References Cited

U.S. PATENT DOCUMENTS

| 9,847,033 B1 * | 12/2017 | Carmack | G01S 19/215 |
| 10,545,246 B1 * | 1/2020 | Johnston | G01S 19/215 |
| 10,948,602 B1 * | 3/2021 | Alexander | G01S 19/21 |

(Continued)

FOREIGN PATENT DOCUMENTS

| JP | 2017033186 A | 2/2017 |
| JP | 2019046176 A | 3/2019 |

OTHER PUBLICATIONS

Luo et al "Localization and Navigation in Autonomous Driving: Threats and Countermeasures," Emerging Information and Communication Technologies for Autonomous Driving, IEEE Wireless Communications, pp. 38-45, Aug. 2019 (Year: 2019).*

(Continued)

*Primary Examiner* — Luu T Pham
*Assistant Examiner* — James J Wilcox
(74) *Attorney, Agent, or Firm* — Womble Bond Dickinson (US) LLP

(57) ABSTRACT

Systems and methods are disclosed for an ADV to leverage pre-defined static objects along a planned route of travel to detect and counter attacks that attempt to change the destination or the planned route. The ADV may detect updates to the static objects if the planned route is changed. Based on the updated static objects, the ADV determines if there is an abnormal re-routing of the planned route or if there is a new route due to a suspicious destination change. The ADV may also leverage the static objects to detect spoofing attacks against the sensor system. The ADV may evaluate if sensors of the sensor system are able to detect and identify the static objects to identify an impaired sensor. The ADV may perform cross-check on the ability of the sensors to detect and identify dynamic objects to gain confidence that the impaired sensor is due to spoofing attacks.

20 Claims, 10 Drawing Sheets

(56) References Cited

U.S. PATENT DOCUMENTS

| | | | | |
|---|---|---|---|---|
| 10,983,220 B2* | 4/2021 | Ashjaee | | G01S 19/28 |
| 11,023,756 B2* | 6/2021 | Joshi | | H04N 5/33 |
| 2008/0250243 A1* | 10/2008 | Bretheim | | H04L 9/3271 |
| | | | | 713/168 |
| 2014/0310805 A1* | 10/2014 | Kandekar | | G06F 21/32 |
| | | | | 726/19 |
| 2015/0166007 A1* | 6/2015 | Hong | | B60R 25/10 |
| | | | | 701/2 |
| 2015/0226858 A1* | 8/2015 | Leibner | | H04K 3/90 |
| | | | | 342/357.59 |
| 2015/0316655 A1* | 11/2015 | Robinson | | G01S 19/42 |
| | | | | 342/357.25 |
| 2015/0331099 A1* | 11/2015 | Wu | | G08G 5/0008 |
| | | | | 342/32 |
| 2016/0099927 A1* | 4/2016 | Oz | | G07C 5/0808 |
| | | | | 726/9 |
| 2016/0225264 A1* | 8/2016 | Taveira | | G08G 5/0013 |
| 2016/0253907 A1* | 9/2016 | Taveira | | G07B 15/00 |
| | | | | 701/3 |
| 2017/0008487 A1 | 1/2017 | Ur et al. | | |
| 2017/0054547 A1* | 2/2017 | Nishimoto | | H04L 12/40 |
| 2017/0070971 A1* | 3/2017 | Wietfeldt | | G01S 19/074 |
| 2017/0243494 A1* | 8/2017 | Taveira | | G08G 5/0069 |
| 2017/0357009 A1* | 12/2017 | Raab | | G01S 19/48 |
| 2018/0025650 A1* | 1/2018 | Taveira | | B64C 39/024 |
| | | | | 701/3 |
| 2018/0224557 A1* | 8/2018 | McMilin | | G01S 19/215 |
| 2018/0307834 A1* | 10/2018 | Xue | | B60R 25/104 |
| 2019/0187294 A1* | 6/2019 | Khalajmehrabadi | | |
| | | | | G01S 19/215 |
| 2019/0204853 A1* | 7/2019 | Miller, Jr. | | G05D 1/0293 |
| 2019/0212738 A1* | 7/2019 | Umetani | | G05D 1/0212 |
| 2019/0219398 A1* | 7/2019 | Sun | | G06K 9/00348 |
| 2019/0268371 A1* | 8/2019 | High | | H04W 4/025 |
| 2019/0294799 A1* | 9/2019 | Kumar | | G05D 1/0055 |
| 2019/0361130 A1* | 11/2019 | Leibner | | G01S 19/215 |
| 2019/0394652 A1* | 12/2019 | Kim | | H04L 43/50 |
| 2020/0094847 A1* | 3/2020 | Goldman | | G01S 17/931 |
| 2020/0371245 A1* | 11/2020 | Murphy | | G01S 19/37 |
| 2020/0379122 A1* | 12/2020 | Tontiruttananon | | G01S 19/215 |
| 2021/0056852 A1* | 2/2021 | Lund | | G08G 1/0112 |
| 2021/0318139 A1* | 10/2021 | Loch | | G01S 19/215 |
| 2021/0331712 A1* | 10/2021 | Lee | | B60W 60/0059 |

OTHER PUBLICATIONS

Kexiong (Curtis) Zeng et al: "All Your GPS Are Belong to US: Towards Stealthy Manipulation of Road Navigation Systems", USENIX, USENIX, The Advanced Computing Systems Association Aug. 14, 2018 (Aug. 14, 2018), pp. 1540-1557.

Sakiz Fatih et al: A survey of attacks and detection mechanisms on intelligent transportation systems: VANETs and IoV, Ad Hoc Networks, Elsevier, Amsterdam, NL, vol. 61, Mar. 18, 2017 (Mar. 18, 2017), pp. 33-50.

Pendleton Scott et al: "Autonomous golf cars for public trial of mobility-on-demand service", 2015 IEEE/RSJ International Conference on Intelligent Robots and Systems (IROS), IEEE, Sep. 28, 2015 (Sep. 28, 2015), pp. 1164-1171.

* cited by examiner

METHODS TO DETECT SPOOFING ATTACKS ON AUTOMATED DRIVING SYSTEMS

TECHNICAL FIELD

Embodiments of the present disclosure relate generally to operating autonomous vehicles. More particularly, embodiments of the disclosure relate to detecting and mitigating cyber-attacks and spoofing attacks on autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control operations depends heavily on the sensors of the vehicle and information extracted from the sensors. Sensors such as cameras, light detection and range (LIDAR) units, radars, etc., are used to capture video and electromagnetic images of environments around the vehicle for motion planning and control. ADVs may also communicate with infrastructure servers or with other ADVs over a communication network to obtain real-time traffic information, data analytics, routing services, information of nearby ADVs, etc., as part of motion planning and control. With the proliferation of ADVs and increased connectivity between the ADVs and the infrastructure, there is the increased risk of a third party launching cyber-attacks or spoofing attacks against vulnerable points of the ADVs to take over control of the ADVs. For example, remote attacks may be accessed through a communication gateway between a vehicle and the infrastructure to change the route or destination of travel of the vehicle. Spoofing attacks may also be launched against the vehicle's sensor system to inactivate, degrade, or otherwise trick a sensor into providing false information to a perception system to steer the vehicle away from its intended route or destination.

Some ADVs attempt to mitigate the threats of attacks by securing the vehicle communication gateway, enhancing individual sensor robustness, or improving the algorithm of the perception system using the sensor information to fend off external spoofing. However, some of these measures may be costly to implement and may not be easily adapted to counter changing threats.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
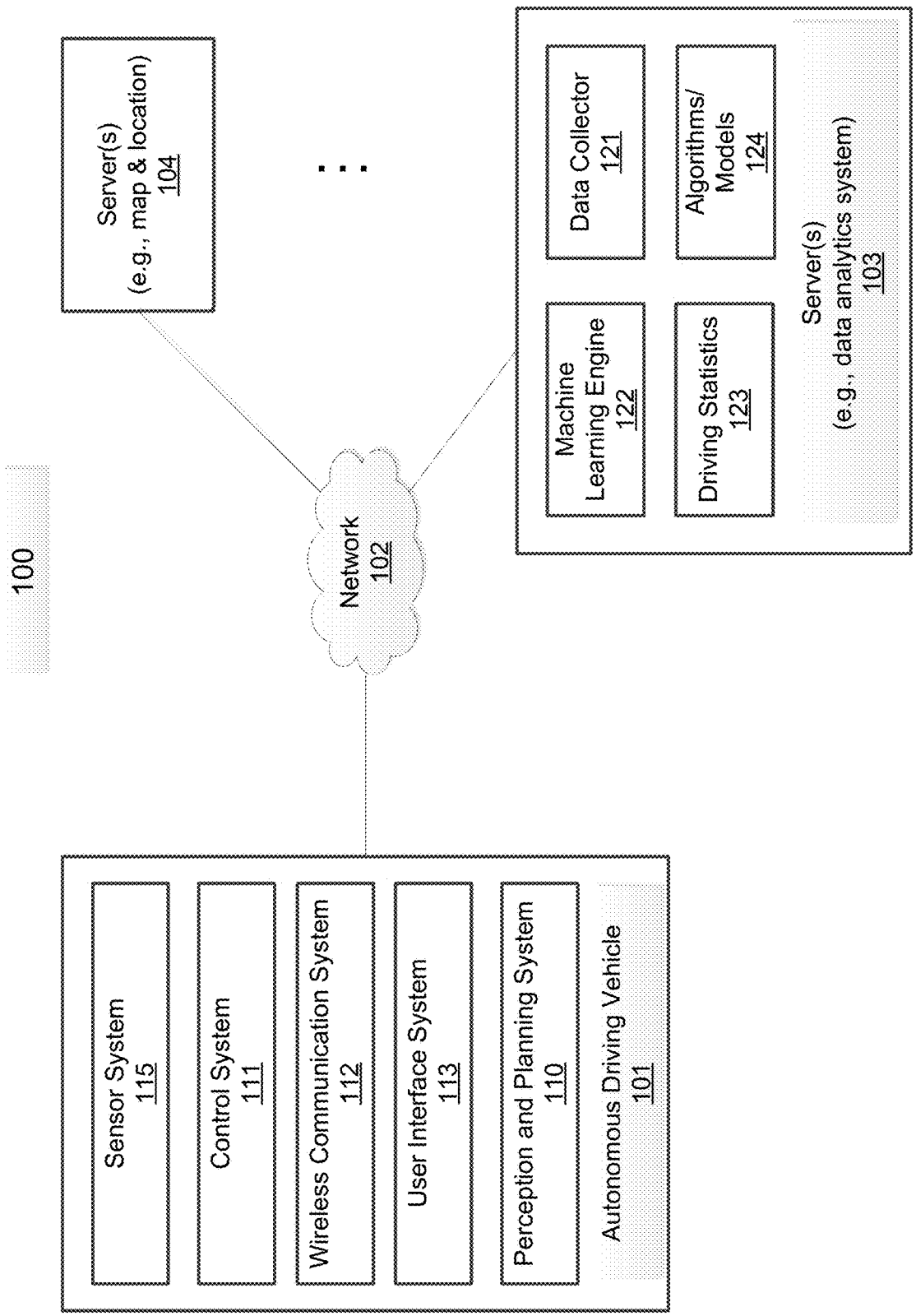
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is disclosed for leveraging pre-defined static objects along a planned route of travel of an ADV to detect and counter attacks that attempt to access the communication gateway of the ADV to change the destination or the planned route. Static objects are distinguishable objects pre-defined on a high definition (HD) map. The static objects may be part of range-of-interest (ROI) or point-of-interest (POI) locations along a route that the vehicle sensor system may use to determine its real-time sensor coverage. For example, the sensor system may detect and identify the static objects when the vehicle travels through the pre-defined locations of the static objects to verify the operational status of the sensor system. The ADV may preload the static objects from the HD map as ground truth points during route planning. Once the static objects of a planned route are loaded, the ADV may ascertain that the static objects are identified as the ADV travels along the route. The static objects may be dynamically updated during re-routing or when the destination changes. The ADV may leverage information about the updating of the static objects to detect abnormal re-routing or destination changes due to cyber-attacks.

In one embodiment, the method may perform static object check to determine if there has been an update to the static objects before the completion of travel. If the static objects have been updated, the method may determine if the destination of the route has changed. In one embodiment, the method may determine the destination has changed by analyzing the route traced by the changed static objects. If the destination has changed, the method may request confirmation of the destination change from a passenger in the vehicle if there is a passenger. If the passenger does not confirm the destination change or if there is no passenger in the vehicle, the method may report the suspicious destination change to a service provider.

If the destination has not changed, the method may determine there has been a re-routing. In one embodiment, the method may confirm the re-route by waiting until a new static object associated with the new route is identified by the sensor system or by verifying that an old static object associated with the previous route cannot be identified. Once the re-route is detected or confirmed, the method may analyze the new route and information surrounding the re-routing to determine if the re-routing is abnormal. For example, the method may analyze the traffic condition, the frequency of the re-routing, the distance of the new route, the difference in the distance from the previous route, the expected travel time of the new route, the difference in the travel time from the previous route, etc., to determine if the re-routing is abnormal. In one embodiment, the method may use machine learning based on learned experience to infer that the re-routing is abnormal. If the re-routing is abnormal, the method may report the abnormal re-routing to the passenger or to the service provider. In one embodiment, the passenger may be allowed to opt out of the trip by requesting the ADV to stop at the nearest safe spot or the passenger may be prompted to inform the service provider as an added safety measure in case the service provider does not receive the report directly from the ADV.

According to some embodiments, a method is disclosed to leverage pre-defined static objects, dynamic objects, and a diversity of sensors to detect and counter spoofing attacks against the sensor system of an ADV. The method may determine if a sensor is disabled or its performance impaired due to a spoofing attack or due to environmental factors. As in the method for leveraging the static objects to detect attacks that attempt to change the destination or the route of travel, the method may preload the pre-defined distinguishable static objects from the HD map as ground truth points during route planning. The static objects may be dynamically updated when the route is dynamically updated. The method may determine if the sensors of the sensor system are able to identify the static objects as the ADV travels along the planned route. If a sensor is not able to identify a static object, the method may temporarily exclude the impaired sensor from being used by the sensor system or the perception system. In one embodiment, the method may determine if another sensor is able to correctly identify the static object or to verify that the impaired sensor is not able to identify additional static objects before deciding to exclude the impaired sensor.

In one embodiment, to differentiate between a sensor that is impaired due to environmental factors such as obstructions, weather conditions, etc., or one that is impaired due to spoofing attacks, the method may perform cross-check on dynamic objects detected by multiple sensors. For example, the method may determine if all the sensors are able to identify dynamic objects (e.g., vehicles, pedestrians) or static objects not pre-defined by the HD map within a sensor coverage area. If multiple sensors are not able to identify a dynamic object or a static object not derived from the HD map, and this only happens briefly, there is a greater likelihood that the temporary impairments by the multiple sensors are due to environmental factors. On the other hand, if only one sensor in the sensor system is not able to identify an object, and the impairment of the one sensor occurs over an extended period of time or over many objects, there is a greater likelihood that the impairment is due to spoofing attacks. The method may dynamically adjust the sensor system coverage in real-time for perception by excluding an impaired sensor. In one embodiment, if the real-time sensor coverage does not allow for continuous operation, the method may active degraded operation to reduce the speed of the vehicle or to allow a driver, if there is one, to take over the operation of the vehicle. In one embodiment, the method may activate the fail operation to stop the vehicle at the nearest safe spot and may inform the passenger or the service provider.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, autonomous vehicle 101 may download pre-defined static objects on HD map from servers 103 or 104 for use in detecting and countering cyber-attacks or spoofing attacks against autonomous vehicle 101.

An autonomous vehicle refers to a vehicle that can be configured in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
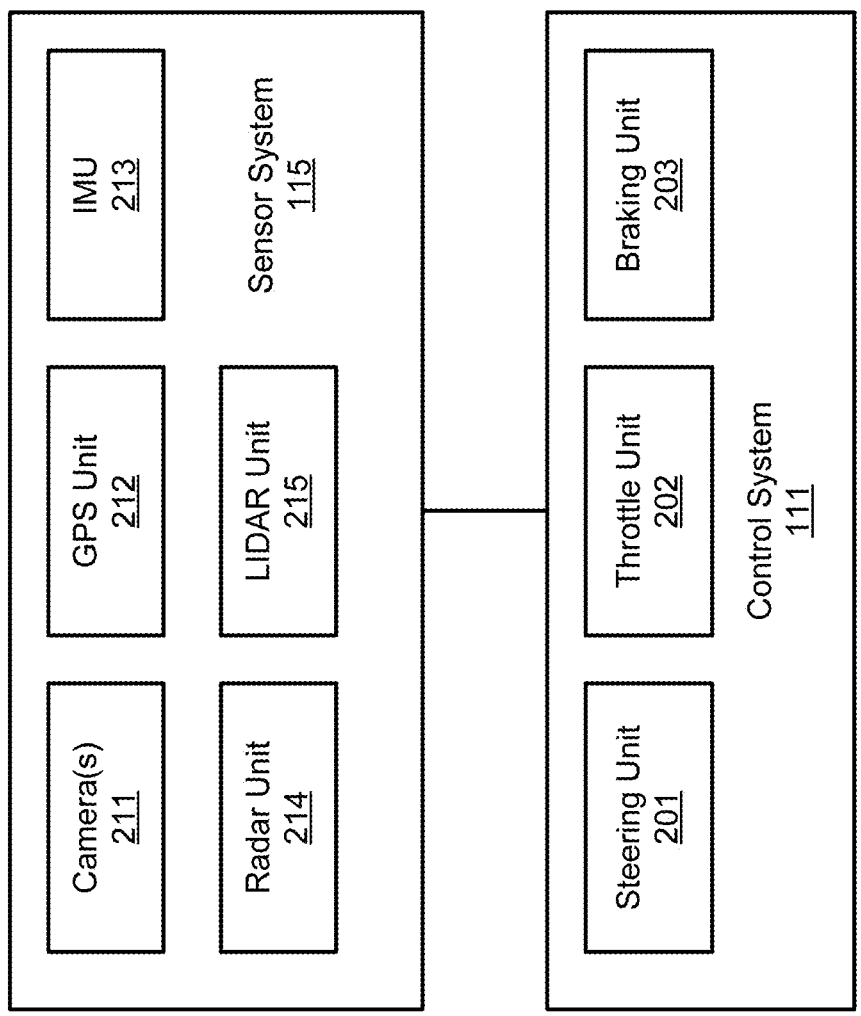
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations, such as the pre-defined static objects for a planned route on HD map for use in detecting and countering cyber-attacks or spoofing attacks against autonomous vehicle 101. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity, such as a service provider that downloads a starting position and a destination position to perception and planning system 110 for perception and planning system 110 to plan a route. The third party may also issue commands to perception and planning system 110 to command autonomous vehicle 101 to start traveling on the planned route. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

Figure 3A:
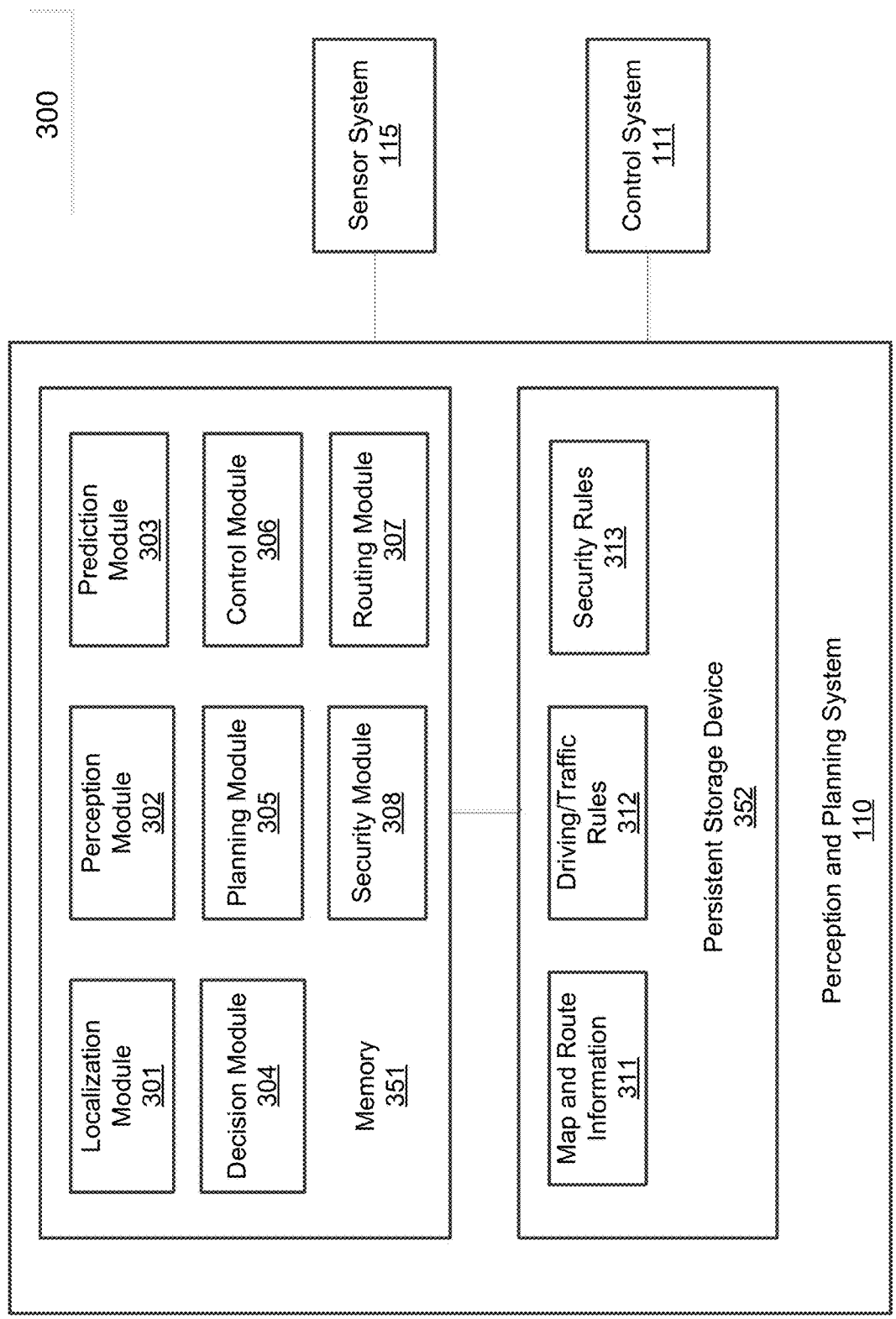
FIGS. 3A-3B are block diagrams illustrating examples of a perception and planning system used by an autonomous vehicle according to some embodiments.
Figure 3B:
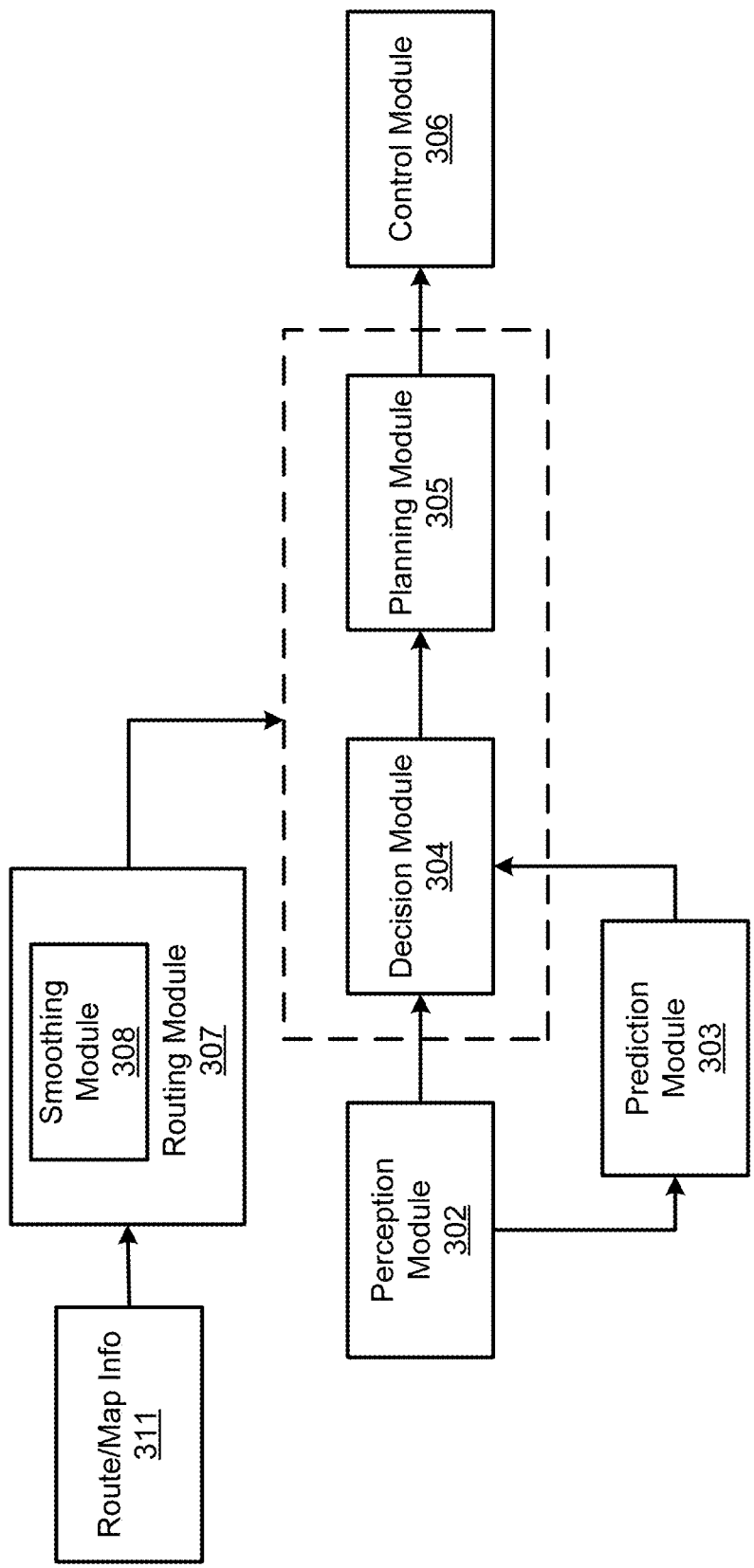

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location, route information and pre-defined static objects for a planned route on HD map from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc. The perception information may include the static objects corresponding to the static objects downloaded from the HD map as ground truth points.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, ground truth points, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

In one embodiment, security module 308 is configured to detect and spoof attacks based on a set of security rules 313. Security module 308 may be implemented as a part of perception module 302 or communicate with perception module 302 or other modules. Security module 308 detects cyber-attack on autonomous vehicle's destination change or abnormal re-routing activities by checking dynamically updated static objects on map along the route together with confirmation from passenger within the autonomous vehicle or service provider. Security module 308 detects spoofing on autonomous vehicle's sensor system by using ground truths on HD map together with multiple sensor confirmation to prevent spoofed sensor/ algorithm from being used in autonomous vehicle continuous operation or fail operation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403.

System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404. In one embodiment, perception layer 403 may include processing changes in pre-defined static objects from HD map to detect attacks that attempt to change destination or to re-route. Perception layer 403 may also include evaluating identification of pre-defined static objects from HD map by sensors and cross-checking checking identification of static and non-HD map static objects by multiple sensors to detect spoofing attacks on the sensors.

Figure 5:
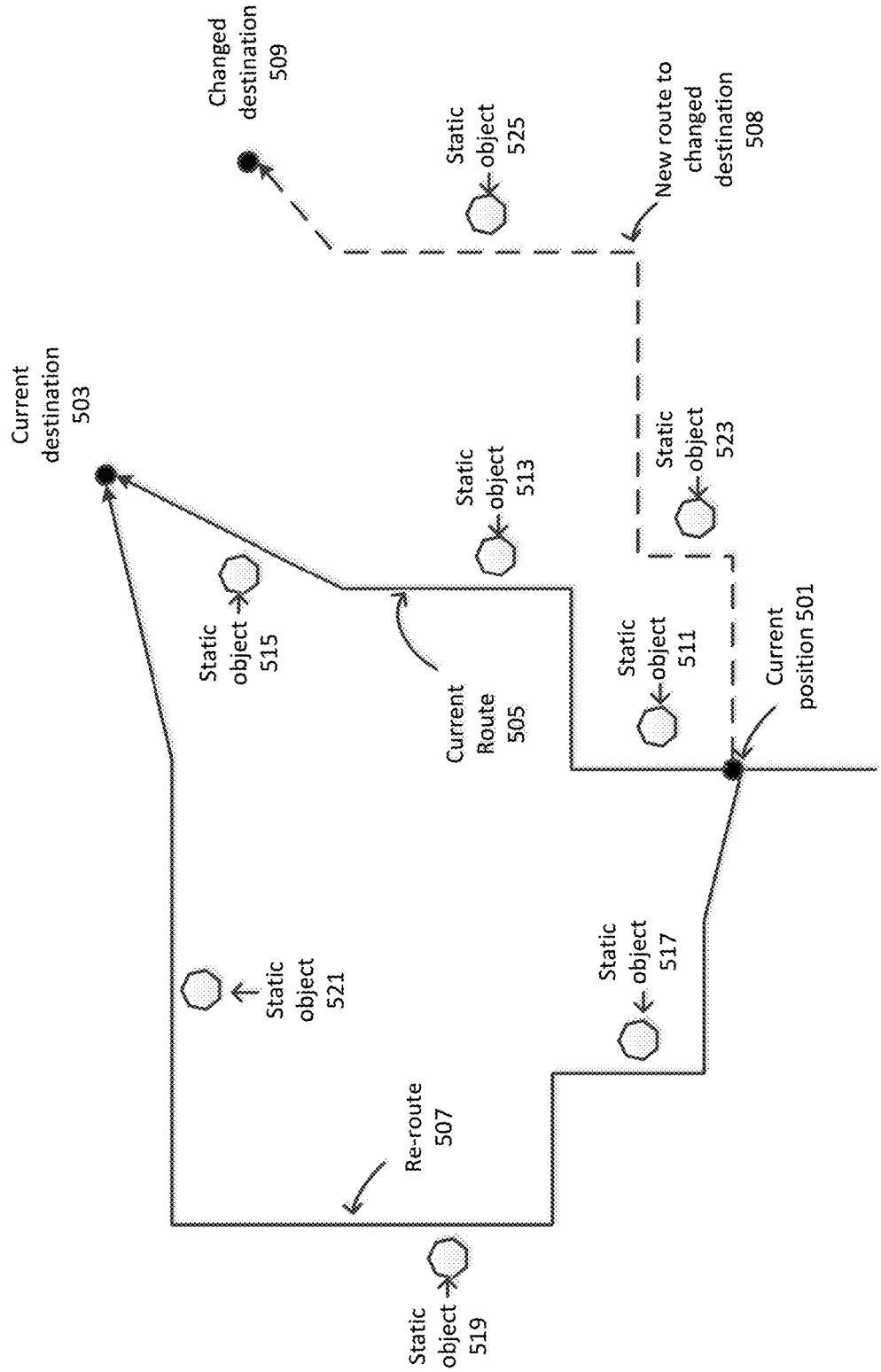
FIGS. 5 is a diagram illustrating a technique to use pre-defined static objects on a map as ground truths to detect attacks that attempt to change the route or the destination of travel of an ADV according to one embodiment.

FIGS. 5 is a diagram illustrating a technique to use pre-defined static objects on a map as ground truths to detect attacks that attempt to change the route or the destination of travel of an ADV according to one embodiment. The ADV is at current position 501 and is traveling along current route 505 to current destination 503. Perception and planning system 110 of the ADV may download pre-defined static objects 511, 513, and 515 (e.g., road signs, mileage markers, etc.) from an HD map as ground truth points along current route 505 during route planning. Static objects 511, 513, and 515 may include information on the objects and the locations of the objects. Perception and planning system 110 may detect and identify static objects 511, 513, and 515 based on information captured by sensor system 115 as the ADV approaches the locations of the objects to determine its real-time sensor coverage.

Perception and planning system 110 may re-route current route 505 based on traffic conditions, accidents, road closures, and other real-time conditions to reduce travel time. In other situations, a service provider or a passenger may change current route 505, add intermediate stopping points, or may change current destination 503. In the case of cyber-attacks exploiting the real-time re-routing function of perception and planning system 110, the attacks may change current route 505 or current destination 503 without the knowledge of the service provider or the passenger. For example, cyber-attacks may change current route 505 to re-route 507 while keeping current destination 507 the same, or may change current route 505 to new route 508 traveling to a different destination, designated as changed destination 509. When the current route is changed, perception and planning system 110 may update the static objects from the HD map. For example, for re-route 507, updated static objects 517, 519, 521 may be downloaded. For new route 508, updated static objects 523 and 525 may be downloaded. Perception and planning system 110 may analyze information about the updating of the static objects to detect abnormal re-routing or suspicious destination changes due to cyber-attacks.

In one embodiment, perception and planning system 110 may detect that static objects 517, 519, and 521 have been downloaded, indicating re-routing to re-route 507. In one embodiment, perception and planning system 110 may wait to confirm that re-routing has occurred by detecting and identifying static object 517 associated with re-route 507. In one embodiment, perception and planning system 100 may not detect re-routing has occurred until it determines that static object 511 associated with current route 505 cannot be identified. Once re-route 507 is detected or confirmed, perception and planning system 110 may analyze the traffic condition, the frequency that a planned route to current destination 503 has been changed, the length of re-route 507, the difference in the route length between re-route 507 and current route 505, the expected travel time of re-route 507 based on traffic condition, the difference in the expected travel time between re-route 507 and current route 505, etc., to determine if re-route 507 is abnormal. For example, if re-route 507 significantly increases distance and travel time even though traffic condition along current route 505, perception and planning system 100 may flag re-route 507 as abnormal. Perception and planning system 100 may report the abnormal re-routing to the service provider or to a passenger, if there is one in the ADV. The passenger may be allowed to opt out of the trip by requesting the ADV to stop at a nearest safe spot or to return to current route 505.

In one embodiment, perception and planning system 110 may determine that new route 508 travels to changed destination 509 by analyzing new route 508 traced by downloaded static object 523 and 525. In one embodiment, perception and planning system 110 may wait to confirm new route 508 by detecting and identifying static object 523 associated with new route 508 or by determining that static object 511 associated with current route 505 cannot be identified. If the destination has changed and there is a passenger in the ADV, the method may request confirmation from the passenger that the destination change was initiated by the passenger. If the passenger does not confirm the destination change, the passenger may be allowed to opt out of the trip by requesting the ADV to stop at a nearest safe spot or to return to current route 505. If there is no passenger in the vehicle, perception and planning system 110 may report the suspicious destination change to the service provider.

Perception and planning system 110 may additionally evaluate if the ability of the sensors of sensor system 115 to correctly identify the static objects has been impaired to determine if there is a spoofing attack against one or more sensors. For example, perception and planning system 110 may evaluate if cameras 211, radar unit 214, and LIDAR unit 215 are able to detect and identify static object 511. If one of the sensors cannot detect or identify static object 511 but the other sensors are able to, perception and planning system 110 may temporarily exclude the impaired sensor from use for perception purposes. In one embodiment, perception and planning system 110 may evaluate if the impaired sensor cannot detect and identify additional static objects, such as static object 513, to confirm that the impairment is not due to environmental factors such as obstructions.

In one embodiment, perception and planning system 110 may evaluate if the sensors are able to detect and identify dynamic objects (e.g., vehicles, pedestrians) or static objects not pre-defined by the HD map within a sensor coverage area. Perception and planning system 110 may take advantage of the diversity of sensors by performing cross-check between the objects identified by the sensors to gain greater confidence that impairment of one sensor is due to spoofing attacks and not due to environmental factors. For example, if only one of multiple cameras 211 of sensor system 115 is not able to identify multiple dynamic and static objects while the visibility is good, there is a good probability that the one camera may have been impaired due to spoofing attacks. Perception and planning system 110 may dynamically adjust the sensors used for perception purposes in real-time by excluding impaired sensors.

Figure 6:
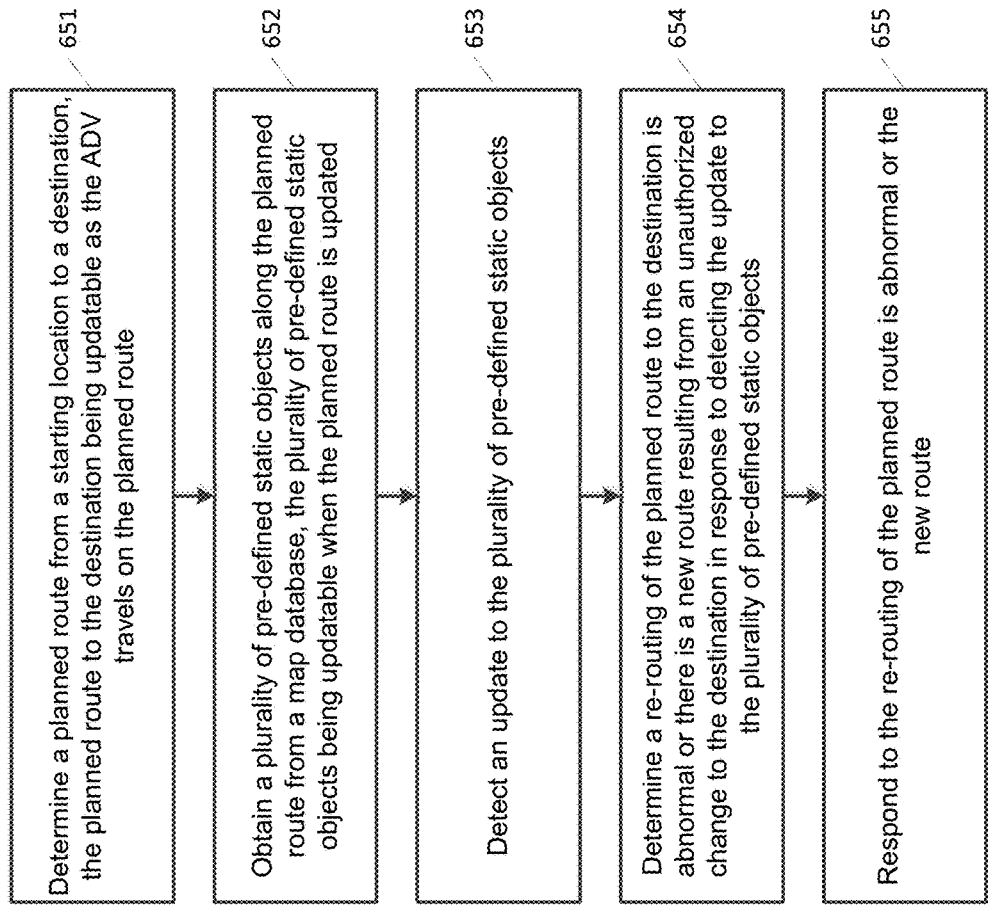
FIG. 6 is a flow diagram illustrating an example of a process of operating an ADV according to one embodiment.

FIG. 6 is a flow diagram illustrating an example of a process of operating an ADV according to one embodiment, which may be performed by processing logic that may include software, hardware, or a combination thereof. Referring to FIG. 6, at block 651, processing logic determine a planned route from a starting location to a destination, which may be updated while the ADV is driving. At block 652, processing logic obtains a set of predefined static objects from the map. At block 653, processing logic detects an update to the predefined static objects. At block 654, processing logic determines a re-routing of the planned route to the destination is abnormal or there is a new route resulting from an unauthorized change to the destination. At block 655, the processing logic responds to the rerouting of the planned route is abnormal or the new route, such as generating an alert.

Figure 7:
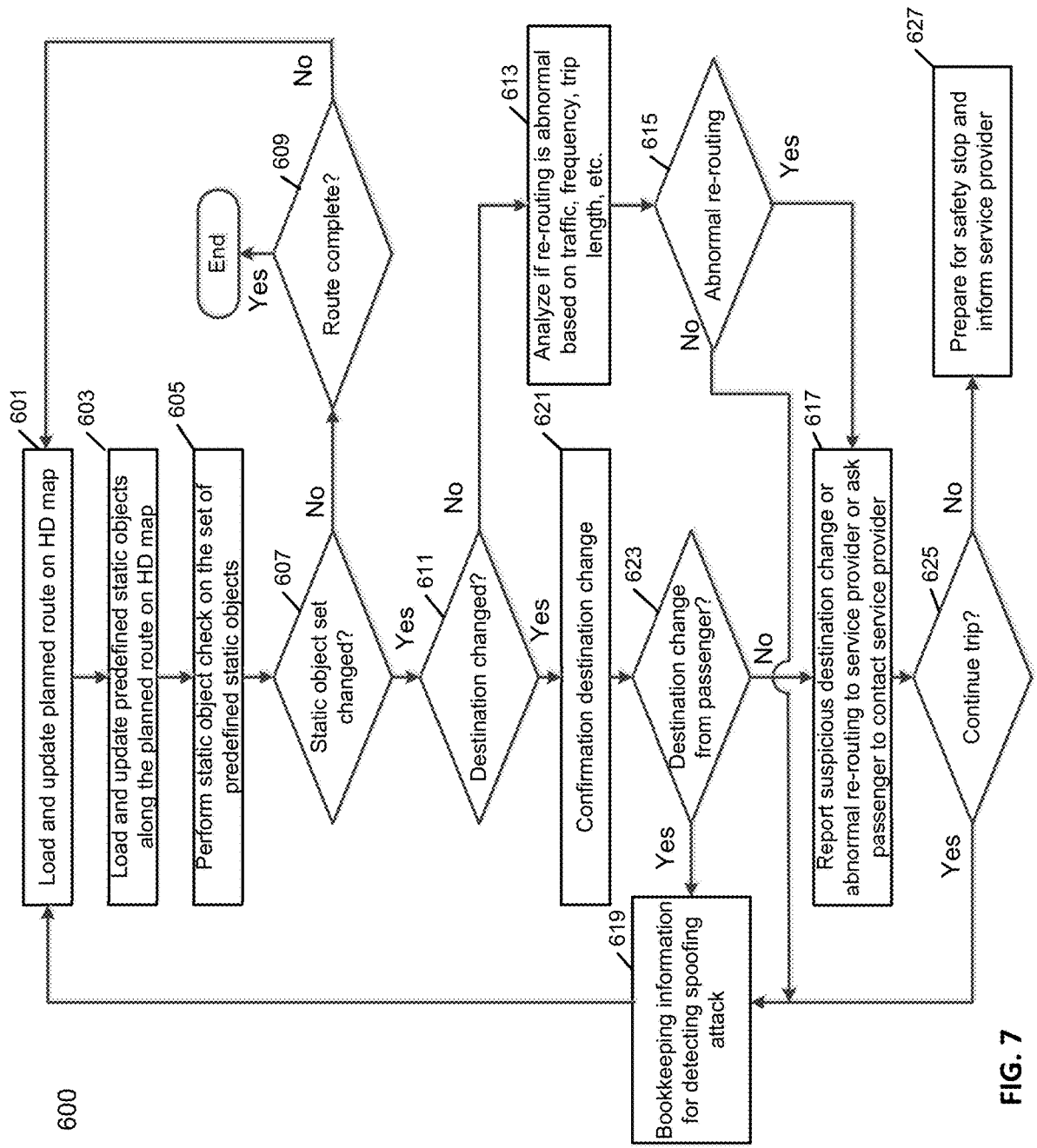
FIG. 7 is a flow diagram illustrating a method for the ADV to use pre-defined static objects as ground truth points to detect and counter cyber-attacks that attempt to change the route or the destination of travel according to one embodiment.

FIG. 7 is a flow diagram illustrating a method 600 for an ADV to use pre-defined static objects as ground truth points to detect and counter cyber-attacks that attempt to change the route or the destination of travel according to one embodiment. Method 600 may be performed by processing logic which may include software, hardware, or a combination thereof. For example, method 600 may be performed by perception and planning system 110.

At operation 601, the method plans a route from a starting point to a destination point based on information provided by the HD map and real-time traffic information. A passenger in the ADV or a service provider such as a freight company operating a passenger-free ADV may specify the starting and destination points.

At operation 603, the method loads and updates pre-defined static objects along the planned route as ground truth points from the HD map. The set of static objects may be part of range-of-interest (ROI) or point-of-interest (POI) locations along the planned route that the vehicle sensor system may use to determine its real-time sensor coverage.

At operation 605, the method performs static object check to determine if there has been any update to the set of static objects. The static objects may be dynamically updated during re-routing due to change in traffic conditions, when the destination is changed as authorized by the passenger or the service provider, or when a cyber-attack re-routes the planned route or changes the destination.

At operation 607, if the method determines that there has been an update to the set of static objects, the method determines if travel along the planned route has completed at operation 609. If travel has not completed along the planned route, the method returns to operations 601 to make any update to the planned route, to update any static objects at operation 603, and to perform static object check at operation 605. If travel has completed along the planned route, the method terminates.

At operation 611, if the static objects have been updated, the method determines if the static objects were updated due to a change in destination or due to re-routing. The method may determine the destination has changed by analyzing the route traced by the changed static objects. If the destination has not changed, the method may determine there has been a re-routing of the planned route to the same destination. In one embodiment, the method may confirm the re-route by waiting until a new static object associated with the new route is identified by the sensor system or by verifying that an old static object associated with the previous route cannot be identified.

At operation 613, if the static objects were updated due to re-routing, the method analyzes the re-route and information surrounding the re-routing to determine if the re-routing is abnormal. For example, the method may analyze the traffic condition, the frequency with which planned routes to the destination have been re-routed, the distance of the re-route, the difference in the distance of the re-route from the previously planned route, the expected travel time of the re-route, the difference in the expected travel time of the re-route from the previously planned route, etc., to determine if the re-routing is abnormal. In one embodiment, the method may use machine learning based on learned experience to infer that the re-routing is abnormal.

At operation 615, if the method determines that the re-routing is abnormal, the method reports the abnormal re-routing to the service provider or the passenger, if there is a passenger in the ADV, at operation 617. The passenger may be asked to contact the service provider as an added safety measure in case the service provider does not receive the report directly from the ADV.

If the method determines that the re-routing is normal, the method records information of the re-route at operation 619. The recorded information, such as the frequency with which planned routes to the destination have been re-routed, may be analyzed by operation 613 to determine if future re-routes are abnormal. The method returns to operations 601 to make any update to the planned route, to update any static objects at operation 603, and to perform static object check at operation 605.

At operation 611, if the method determines that the static objects were updated due to a change in destination, the method confirms the destination change with the passenger, if there is a passenger inside the ADV, at operation 621.

At operation 623, if the passenger does not confirm the destination change was requested by the passenger or if there is no passenger in the ADV, the method reports the suspicious destination change to the service provider at operation 617. If there is a passenger, the passenger may be asked to contact the service provider as an added safety measure in case the service provider does not receive the report directly from the ADV.

If the passenger confirms that the destination change was requested by the passenger, the method records information of destination change at operation 619. The method returns to operations 601 to make any update to the planned route, to update any static objects at operation 603, and to perform static object check at operation 605.

At operation 625, if there is a suspicious destination change or abnormal re-routing, the method prompts the passenger for instruction on whether to continue the trip. At operation 627, if the passenger opts to terminate the trip, the method requests the ADV to stop at the nearest safe spot and reports the termination of the trip to the service provider. If the passenger wishes to continue the trip, the method records information of the suspicious destination change or the abnormal re-routing at operation 619 and the trip continues.

Figure 8:
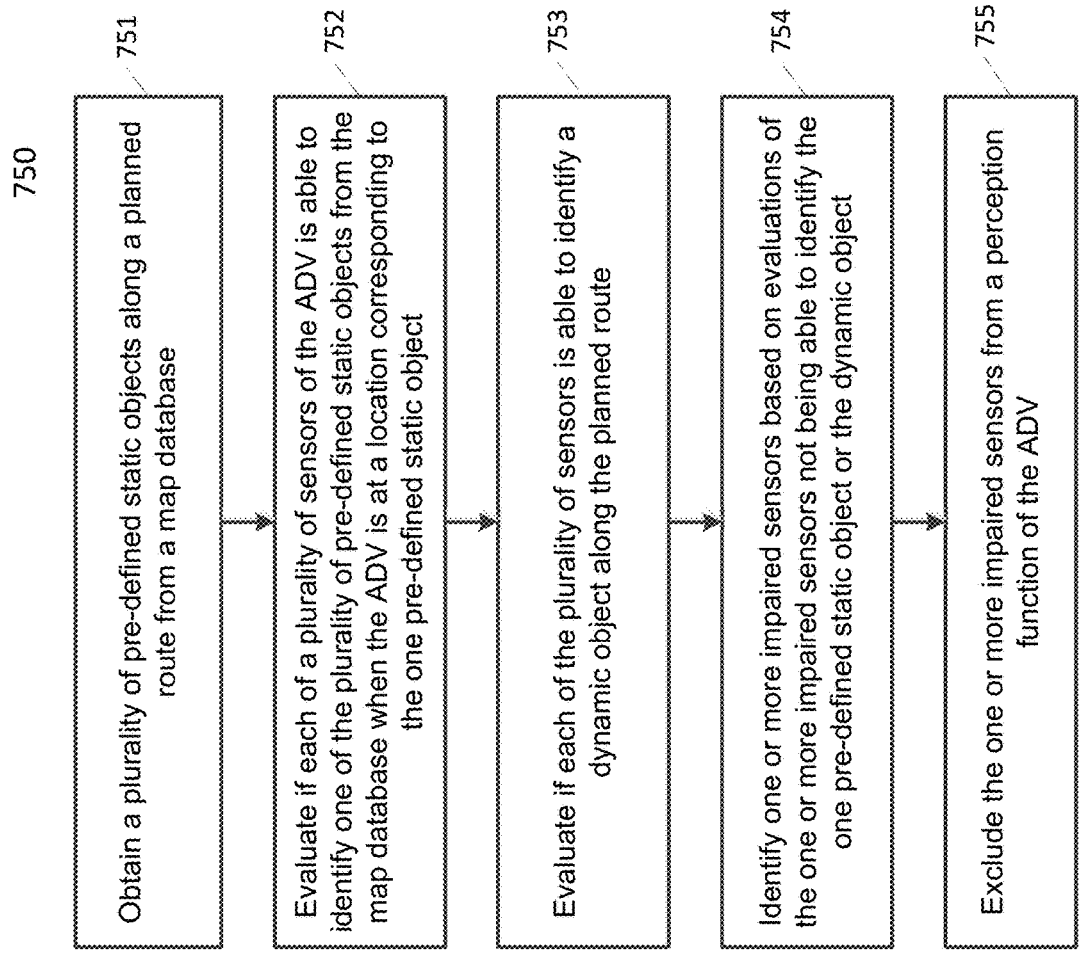
FIG. 8 is a flow diagram illustrating an example of a process of operating an ADV according to one embodiment.

FIG. 8 is a flow diagram illustrating an example of a process of operating an ADV according to one embodiment. Process 750 may be performed by processing logic which may include software, hardware, or a combination thereof. Referring to FIG. 8, at block 751, processing logic obtains a set of pre-defined static objects along a planned route from a map. At block 752, processing logic evaluates if each of the sensors of the ADV is able to identify the pre-defined static objects. At block 753, processing logic evaluates if each of the sensor is able to identify a dynamic object along the planned route. At block 754, processing logic identifies one or more impaired sensors based on the evaluations of the impaired sensors not being able to identify the static and dynamic objects. At block 755, the impaired sensors are excluded from being used by the perception function of the ADV.

Figure 9:
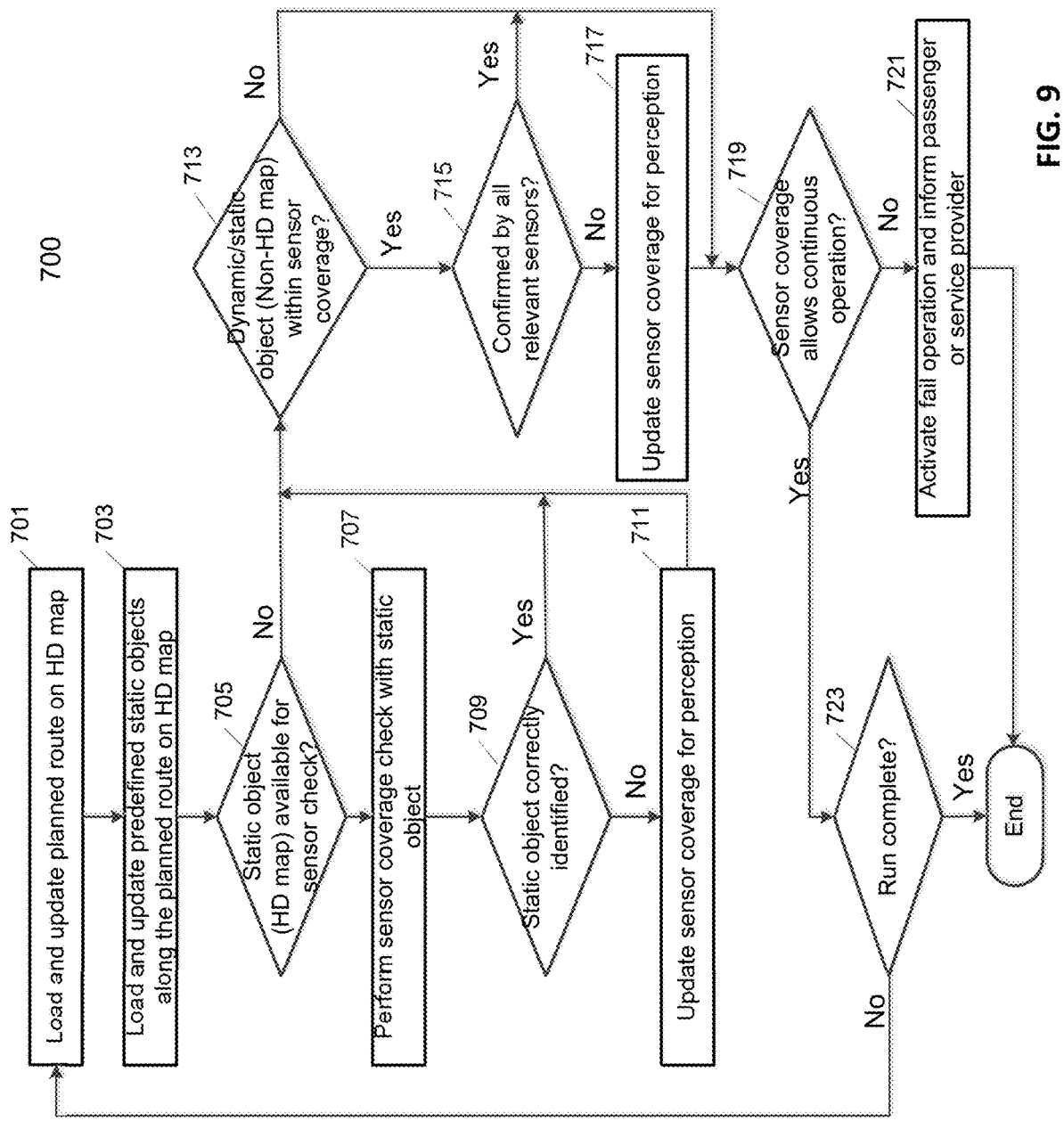
FIG. 9 is a flow diagram illustrating a method for the ADV to use pre-defined static objects, dynamic objects, and a diversity of sensors to detect and counter spoofing attacks against the sensor system according to one embodiment.

FIG. 9 is a flow diagram illustrating a method 700 for the ADV to use pre-defined static objects, dynamic objects, and a diversity of sensors to detect and counter spoofing attacks against the sensor system according to one embodiment. Method 700 may be performed by processing logic which may include software, hardware, or a combination thereof. For example, method 700 may be performed by perception and planning system 110.

Operations 701 and 703 are similar to operations 601 and 603 of FIG. 7. Descriptions of operations 701 and 703 will not be repeated for brevity. At operation 705, the method determines if the ADV is at a location along the planned route where there is a static object from the HD map for performing sensor system coverage check. The sensor system coverage check may identify the sensors of the sensor system to be used for perception function.

At operation 707, if there is at least one static object from the HD map at the current location, the method performs the sensor system coverage check using the static object. The method may determine if sensors of the sensor system are able to detect and identify the static object.

At operation 709, if the method determines that a sensor of the sensor system is not able to detect and identify the static object from the HD map at the current location, the method temporarily updates the sensor system coverage to exclude the impaired sensor from the perception function at operation 711. The method may evaluate whether the impaired sensor also cannot detect and identify additional static objects from the HD map, dynamic objects, or non-HD map derived static objects to confirm that the impairment of the sensor is not due to environmental factors such as obstructions.

If there is no static object from the HD map available at the current location, if all the sensors of the sensor system are able to detect the static object from the HD map at the current location, or if the sensor system coverage has been updated to exclude an impaired sensor, the method determines if there are any dynamic objects (e.g., vehicles, pedestrians) or static objects not pre-defined by the HD map within the sensor coverage area at the current location at operation 713.

At operation 715, if the method determines there is at least one dynamic object or non-HD map derived static object available for sensor system coverage check at the current location, the method determines if all sensors in the sensor system coverage are able to detect and identify the dynamic object or the non-HD map derived static object. The method may perform cross-check on the dynamic object or the non-HD map derived static object identified by multiple sensors to confirm whether a sensor is impaired due to environmental factors or due to spoofing attacks. For example, if multiple sensors simultaneously are not able to identify a dynamic object or a non-HD map derived static object for a brief period of time, there is a greater likelihood that the temporary impairments by the multiple sensors are due to environmental factors. On the other hand, if only one sensor in the sensor system is not able to identify an object, and the impairment of the one sensor occurs over an extended period of time or over many objects, there is a greater likelihood that the impairment is due to spoofing attacks. In one embodiment, the method may confirm whether any impaired sensor that was not able to detect static objects from the HD map and was excluded from the sensor system coverage is still not able to detect and identify the dynamic object or the non-HD map derived static object.

At operation 717, if any one of the sensors is not able to detect and identify the dynamic object or the non-HD map derived static object, the method may update the sensor system coverage to exclude the impaired sensor from the perception function. If all the sensors are able to detect and identify the dynamic object or the non-HD map derived static object, the method may update the sensor system coverage to include all the sensors as capable of providing sensor inputs for the perception function.

At operation 719, the method determines if the sensor system coverage allows continuous operation of the perception function. In one embodiment, the method may determine if a minimum number of sensors are in the sensor system coverage.

At operation 721, if the sensor system coverage does not allow continuous operation of the perception function, the method activates degraded operation to reduce the speed of the vehicle or to allow a driver, if there is one, to take over the operation of the vehicle. In one embodiment, the method may activate the fail operation to stop the vehicle at the nearest safe spot and may inform the passenger or the service provider of the fail operation.

If the sensor system coverage allows continuous operation of the perception function, the method determines whether the trip is completed at operation 723. If the trip is not completed along the planned route, the method returns to operation 701 to perform the sensor system coverage check using additional static objects from the HD map, dynamic objects, or non-HD map derived static objects based on the diversity of sensors. If the trip is completed, the method terminates.

A data processing system may perform any of the processes or methods described above, such as, for example, the cyber-attack or the spoofing detection method. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm as used here is generally conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for detecting a spoofing attack against an autonomous driving vehicle (ADV), the method comprising:
   determining a planned route from a starting location to a destination, the planned route to the destination being updatable as the ADV travels on the planned route;
   obtaining a plurality of pre-defined static objects along the planned route from a map database, the plurality of pre-defined static objects being updatable when the planned route is updated;
   detecting an update to the plurality of pre-defined static objects;
   determining that a re-routing of the planned route is associated with the spoofing attack based on a frequency of past re-routings of the planned route, and a distance of the planned route in response to detecting the update to the plurality of pre-defined static objects;
   determining a change to the destination by analyzing a new route traced by a plurality of updated pre-defined static objects;
   confirming that a passenger in the ADV does not request the change to the destination to determine that the re-routinq is associated with the spoofinq attack;
   confirming that there is the passenger in the ADV;
   prompting the passenger in the ADV to request stopping the ADV; and
   sending a report that the re-routing of the planned route is associated with the spoofing attack.

2. The method of claim 1, further comprising : analyzing one or more of a traffic condition, a difference in distances between the abnormal re-routing and the planned route, a travel time of the planned route, or a difference in travel times between the abnormal re-routing and the planned route to determine that the re-routing of the planned route is associated with the spoofing attack.

3. The method of claim 1, further comprising: verifying that an updated pre-defined static object is identified to confirm that the planned route is re-routed.

4. The computer-implemented of claim 1, further comprising:
   evaluating if each of a plurality of sensors of the ADV is able to identify one of the plurality of pre-defined static objects from the map when the ADV is at a location corresponding to a pre-defined static object;
   evaluating if each of the plurality of sensors is able to identify a dynamic object along the planned route; and
   identifying one or more impaired sensors based on evaluations of the one or more impaired sensors not being able to identify the pre-defined static object or the dynamic object; and
   excluding the one or more impaired sensors from a perception function of the ADV.

5. The computer-implemented method of claim 1, wherein the determining that the re-routing of the planned route is associated with the spoofing attack is based on a difference in the distance from a previous route.

6. The computer-implemented method of claim 1, wherein the determining that the re-routing of the planned route is associated with the spoofing attack is based on a travel time of the new route.

7. The computer-implemented method of claim 1, wherein the determining that the re-routing of the planned route is associated with the spoofing attack is based on a traffic condition.

8. A non-transitory machine-readable medium having instructions stored therein, which when executed by a processor, cause the processor to perform operations for detecting a spoofing attack against an autonomous driving vehicle (ADV), the operations comprising:
   determining a planned route from a starting location to a destination, the planned route to the destination being updatable as the ADV travels on the planned route;
   obtaining a plurality of pre-defined static objects along the planned route from a map database, the plurality of pre-defined static objects being updatable when the planned route is updated;

detecting an update to the plurality of pre-defined static objects;

determining that a re-routing of the planned route is associated with the spoofing attack based on a frequency of past re-routings of the planned route, and a distance of the planned route in response to detecting the update to the plurality of pre-defined static objects;

determining a change to the destination by analyzing a new route traced by a plurality of updated pre-defined static objects; and confirming that a passenger in the ADV does not request the change to the destination to determine that the re-routing is associated with the spoofing attack;

confirming that there is the passenger in the ADV;

prompting the passenger in the ADV to request stopping the ADV; and sending a report that the re-routing of the planned route is associated with the spoofing attack.

9. The non-transitory machine-readable medium of claim 8, further comprising instructions, which when executed by the processor, cause the processor to perform operations comprising:

analyzing one or more of a traffic condition, a difference in distances between the abnormal re-routing and the planned route, a travel time of the planned route, or a difference in travel times between the abnormal re-routing and the planned route to determine that the re-routing of the planned route is associated with the spoofing attack.

10. The non-transitory machine-readable medium of claim 8, further comprising instructions, which when executed by the processor, cause the processor to perform operations comprising :

verifying that an updated pre-defined static object is identified to confirm the planned route is re-routed.

11. The non-transitory machine-readable medium of claim 8, further comprising instructions, which when executed by the processor, cause the processor to perform operations comprising:

evaluating if each of a plurality of sensors of the ADV is able to identify one of the plurality of pre-defined static objects from the map when the ADV is at a location corresponding to a pre-defined static object;

evaluating if each of the plurality of sensors is able to identify a dynamic object along the planned route; and identifying one or more impaired sensors based on evaluations of the one or more impaired sensors not being able to identify the pre-defined static object or the dynamic object; and excluding the one or more impaired sensors from a perception function of the ADV.

12. The non-transitory machine-readable medium of claim 8, wherein the determining that the re-routing of the planned route is associated with the spoofing attack is based on a difference in the distance from a previous route.

13. The non-transitory machine-readable medium of claim 8, wherein the determining that the re-routing of the planned route is associated with the spoofing attack is based on a difference in the distance from a previous route.

14. The non-transitory machine-readable medium of claim 8, wherein the determining that the re-routing of the planned route is associated with the spoofing attack is based on a traffic condition.

15. A system to detect a spoofing attack against an autonomous driving vehicle (ADV), comprising:

a memory; and a processor coupled to the memory, wherein the processor is configured to: determine a planned route from a starting location to a destination, the planned route to the destination being updatable as the ADV travels on the planned route;

obtain a plurality of pre-defined static objects along the planned route from a map database, the plurality of pre-defined static objects being updatable when the planned route is updated;

detect an update to the plurality of pre-defined static objects;

determine that a re-routing of the planned route is associated with the spoofing attack based on a frequency of past re-routings of the planned route, and a distance of the planned route in response to detecting the update to the plurality of pre-defined static objects;

determine a change to the destination by analyzing a new route traced by a plurality of updated pre-defined static objects;

confirm that a passenger in the ADV does not request the change to the destination to determine that the re-routing is associated with the spoofing attack;

confirm that there is the passenger in the ADV;

prompt the passenger in the ADV to request stopping the ADV; and send a report that the re-routing of the planned route is associated with the spoofing attack.

16. The system of claim 15, wherein the processor is further configured to:

analyze one or more of a traffic condition, a difference in distances between the abnormal re-routing and the planned route, a travel time of the planned route, or a difference in travel times between the abnormal re-routing and the planned route to determine that the re-routing of the planned route is associated with the spoofing attack.

17. The system of claim 15, wherein the processor is further configured to:

verify that an updated pre-defined static object is identified to confirm that the planned route is re-routed.

18. The system of claim 15, wherein the processor is further configured to:

evaluate if each of a plurality of sensors of the ADV is able to identify one of the plurality of pre-defined static objects from the map when the ADV is at a location corresponding to a pre-defined static object;

evaluate if each of the plurality of sensors is able to identify a dynamic object along the planned route; and identify one or more impaired sensors based on evaluations of the one or more impaired sensors not being able to identify the pre-defined static object or the dynamic object; and exclude the one or more impaired sensors from a perception function of the ADV.

19. The system of claim 15, wherein the processor is further configured to:

determine that the re-routing of the planned route is associated with the spoofing attack based on a difference in the distance from a previous route.

20. The system of claim 15, wherein the processor is further configured to:

determine that the re-routing of the planned route is associated with the spoofing attack based on at least one of a difference in the distance from a previous route or a traffic condition.

* * * * *